US007010906B2

(12) United States Patent
Cazenave et al.

(10) Patent No.: US 7,010,906 B2
(45) Date of Patent: Mar. 14, 2006

(54) GAS TURBINE ENGINE HAVEING A DISCONNECT PANEL FOR ROUTING PIPES AND HARNESSES BETWEEN A FIRST AND A SECOND ZONE

(75) Inventors: Olivier J-F Cazenave, Derby (GB); Robert E. Sherlock, Derby (GB); Tim A. Clark, Pontefract (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/826,372

(22) Filed: Apr. 19, 2004

(65) Prior Publication Data

US 2005/0097882 A1    May 12, 2005

Related U.S. Application Data

(63) Continuation-in-part of application No. 10/274,046, filed on Oct. 21, 2002, now abandoned.

(30) Foreign Application Priority Data

Nov. 2, 2001  (GB) .................................. 0126371

(51) Int. Cl.
*F02K 3/02* (2006.01)

(52) U.S. Cl. ................. 60/226.1; 439/34; 138/111; 244/129.1

(58) Field of Classification Search .............. 60/226.1, 60/796, 797, 798, 39.091; 285/137.1; 439/34, 439/178, 179, 191; 138/111, 113; 174/95; 244/129.1

See application file for complete search history.

(56) References Cited

U.S. PATENT DOCUMENTS

| 2,622,393 | A | * | 12/1952 | Garr et al. ............... 60/39.281 |
| 3,146,052 | A | * | 8/1964 | Burch et al. .................. 439/34 |
| 3,323,307 | A | * | 6/1967 | Hardy ....................... 60/226.1 |
| 3,541,794 | A | * | 11/1970 | Bollenbacher et al. ...... 60/226.2 |
| 3,675,418 | A | * | 7/1972 | Lenkeit et al. ................ 60/797 |
| 3,996,964 | A | * | 12/1976 | McCombs .................. 137/885 |
| 4,069,662 | A | * | 1/1978 | Redinger et al. .......... 60/226.1 |
| 4,116,000 | A | * | 9/1978 | Martin et al. ................. 60/242 |
| 4,151,710 | A | * | 5/1979 | Griffin et al. .............. 60/39.08 |
| 4,182,119 | A | * | 1/1980 | Hurley ...................... 60/226.1 |
| 4,255,083 | A | * | 3/1981 | Andre et al. ................ 415/119 |
| 4,266,741 | A | * | 5/1981 | Murphy ....................... 244/54 |
| 4,304,093 | A | * | 12/1981 | Schulze ....................... 60/806 |
| 4,441,314 | A | * | 4/1984 | Fitton .......................... 60/266 |
| 4,474,001 | A | * | 10/1984 | Griffin et al. ................. 60/204 |
| 4,603,821 | A | * | 8/1986 | White ......................... 244/54 |
| 4,815,984 | A | * | 3/1989 | Sugiyama et al. .......... 439/211 |
| 5,012,639 | A | * | 5/1991 | Ream et al. ............... 60/226.1 |

(Continued)

*Primary Examiner*—William H. Rodriguez
(74) *Attorney, Agent, or Firm*—W. Warren Taltavull; Manelli Denison & Selter PLLC

(57) ABSTRACT

A gas turbine engine (10) includes a first fire zone (Zone 3) in the region of a core of the engine and a second fire zone (Zone 1) in the region of a fan case of the engine, the first and second fire zones being separated by fire walls. The first fire zone is located generally radially inwardly of the second fire zone but includes a bifurcation part which extends radially outwardly of the remainder of the zone for limited circumferential extent. The engine further includes a disconnect panel (52) mounted on the fan case (32) to extend radially outwardly therefrom, the disconnect panel (52) forming a fire wall and providing means for pipes and harnesses (44) to be routed therethrough.

20 Claims, 8 Drawing Sheets

U.S. PATENT DOCUMENTS

| | | | |
|---|---|---|---|
| 5,174,110 A | * 12/1992 | Duesler et al. | 60/226.1 |
| 5,435,124 A | * 7/1995 | Sadil et al. | 60/796 |
| 5,725,181 A | * 3/1998 | Hey | 244/54 |
| 5,867,977 A | * 2/1999 | Zachary et al. | 60/39.53 |
| 5,873,547 A | * 2/1999 | Dunstan | 244/54 |
| 6,401,448 B1 | * 6/2002 | Manteiga et al. | 60/226.1 |
| 6,802,479 B1 | * 10/2004 | Howe et al. | 244/129.1 |
| 2003/0126854 A1 | * 7/2003 | Cazenave et al. | 60/226.1 |

* cited by examiner

GAS TURBINE ENGINE HAVEING A DISCONNECT PANEL FOR ROUTING PIPES AND HARNESSES BETWEEN A FIRST AND A SECOND ZONE

This is a CIP of 10/274,046 filed Oct. 21, 2002, now abandoned.

FIELD OF THE INVENTION

The invention relates to gas turbine engines for aircraft and particularly to the routing of pipes and harnesses within such engines.

BACKGROUND OF THE INVENTION

Gas turbine engines are divided into a number of 'fire zones', the different fire zones tending to operate at respectively different temperatures when the engine is functioning, and being separated by 'fire walls'. The fire walls prevent any flammable fluid leakage between the various zones and help to prevent the spread of a fire from one zone to another.

Typically, the core region of the engine comprises one or two zones, normally referred to as Zones 2 and 3, and the region outside the fan case constitutes a separate zone, referred to as Zone 1. There is also a bypass zone in the region in which bypass air flows, between the core and the fan case.

Zone 3 is located generally radially inwards of Zone 1. However, typically Zone 3 is extended radially outwardly and downwardly into the general area of Zone 1, for a limited circumferential extent, in a lower region of the engine. This extended Zone 3 region forms a "bifurcation", because bypass air is forced to pass around it, the air being directed by a splitter fairing.

It is necessary for pipes and harnesses to pass from the core region, for example from Zone 3, to the fan case region (Zone 1). At a base of the extended Zone 3 region, there is a 'bifurcation disconnect panel' through which all the pipes and harnesses extending from Zone 3 to Zone 1 pass. This panel forms a fire wall and allows the pipes and harnesses to be disconnected at the panel or removed from the panel for line replacement.

For engines with fan case mounted accessories, power for the accessories of the engine, for example the electrics, the hydraulic pump, the oil and fuel pumps, etc. is provided by a generator which is driven from the high pressure turbine shaft but which is mounted on the fan case in Zone 1. It is thus necessary to provide a drive means between the high pressure turbine drive shaft and the fan case, this drive means passing from Zone 3 to Zone 1. This is termed the radial drive. The radial drive must therefore pass through the bifurcation disconnect panel.

The above described prior art arrangement has certain disadvantages. The pipes and harnesses are usually required to cross the fire wall at a right-angle. There are also requirements for a minimum straight section before and after the disconnect region where the pipes and harnesses cross the panel, as well as a minimum bend radius. These constraints affect the pipe and harness routing, creating unnecessary bends. The resulting intricate design makes clashes more likely and harder to detect during design and makes modifications from an original design more difficult to accommodate and unnecessarily complex. The routing of the pipes and harnesses appears untidy and is therefore difficult to follow and likely to cause confusion and reduce accessibility for maintenance. It is also necessary to provide large numbers and various different types of brackets, lugs and clips to hold the pipes and harnesses. This increases the manufacturing costs and increases the removal/refit time.

A further disadvantage of the prior art arrangement relates to the routing of the radial drive. Currently, there is a D-seal between a radial drive shroud and the bifurcation disconnect panel. This causes various problems. Firstly, the fan excitation of the splitter fairing, as well as the relative movement between the core and the fan case, cause the D-seal to wear out quickly. For similar reasons, an O-ring seal provided between the radial drive shroud and the transfer gearbox has been known to fail in service, producing oil leakage. Secondly, the size of the D-seal support dictates how closely the splitter fairing can be wrapped around the radial drive. A larger splitter fairing is less aerodynamically efficient than a small one.

SUMMARY OF THE INVENTION

According to the invention there is provided a gas turbine engine comprising a core engine having a first fluid system and a fan case region having a second fluid system wherein both fluid systems consist of one or more of oil, gas or fuel pipes and are connected via pipes and harnesses, the pipes and harnesses are releasable at a disconnect panel, characterised in that the disconnect panel comprises at least two angled portions for routing the pipes and harnesses therethrough, the at least two angled portions providing at least two surfaces for substantially perpendicular intersection with the pipes and harnesses.

Preferably, each of the portions are substantially planar.

Preferably, the disconnect panel comprises a centre portion and two side portions.

Preferably, the at least two angled portions are angled between 10 and 80 degrees relative to one another and more preferably between 30 and 60 degrees relative to one another.

Alternatively, at least one of the portions is arcuate. Preferably, the least one arcuate portion comprises an end angle relative to the principle plane of other portion, the end angle is between 10 and 80 degrees and more preferably the end angle is between 30 and 60 degrees.

Preferably, the disconnect panel comprises a centre portion which is substantially planar and two side portions which are arcuate.

Preferably, the disconnect panel is a fire wall.

Preferably, the engine comprises a nacelle, when the nacelle enclose the engine it sealably engaged with the disconnect panel.

Preferably, a gas turbine engine comprises a first zone (Zone 3) in the region of the core engine and a second fire zone (Zone 1) in the region of the fan case of the engine the first (Zone 3) and second (Zone 1) fire zones being separated by fire walls; the first fire zone (Zone 3) is located generally radially inwardly of the second fire zone (Zone 1) but includes a bifurcation part which extends radially outwardly of the remainder of the zone for a limited circumferential extent; wherein the engine further includes the disconnect mounted on the fan case to extend generally radially outwardly therefrom, the member forming a fire wall between the first and second zones and providing means for pipes and harnesses to be routed therethrough.

Preferably, the disconnect panel is mounted to extend downwardly from the fan case, when the engine is in its normal orientation as mounted on an aircraft.

Preferably, the fan case comprises a rear part, and the disconnect panel is mounted on the rear part.

Preferably, the disconnect panel further includes a mounting portion, the mounting portion is adapted for attachment to the fan case and preferably, the mounting portion extends back from the mid-portion of the radial drive to the top of the disconnect panel and lies in a plane that is generally perpendicular to the plane of the mid-portion of the radial drive.

Preferably, the disconnect panel comprises a material that is able to withstand 1100° C. for 15 minutes with a standard flame producing 116 k W/m²±10 kW/m².

Preferably, the gas turbine engine further includes a turbine drive shaft, a gearbox and a radial drive, the radial drive connecting the turbine drive shaft to the gearbox mounted on the fan case, the radial drive passing through the fan case.

Preferably, a bellow-seal is provided between the radial drive and the fan case and the bellow-seal is fireproof.

BRIEF DESCRIPTION OF THE DRAWINGS

An embodiment of the invention will be described for the purpose of illustration only with reference to the accompanying drawings in which.

DETAILED DESCRIPTION OF THE INVENTION

Figure 1:
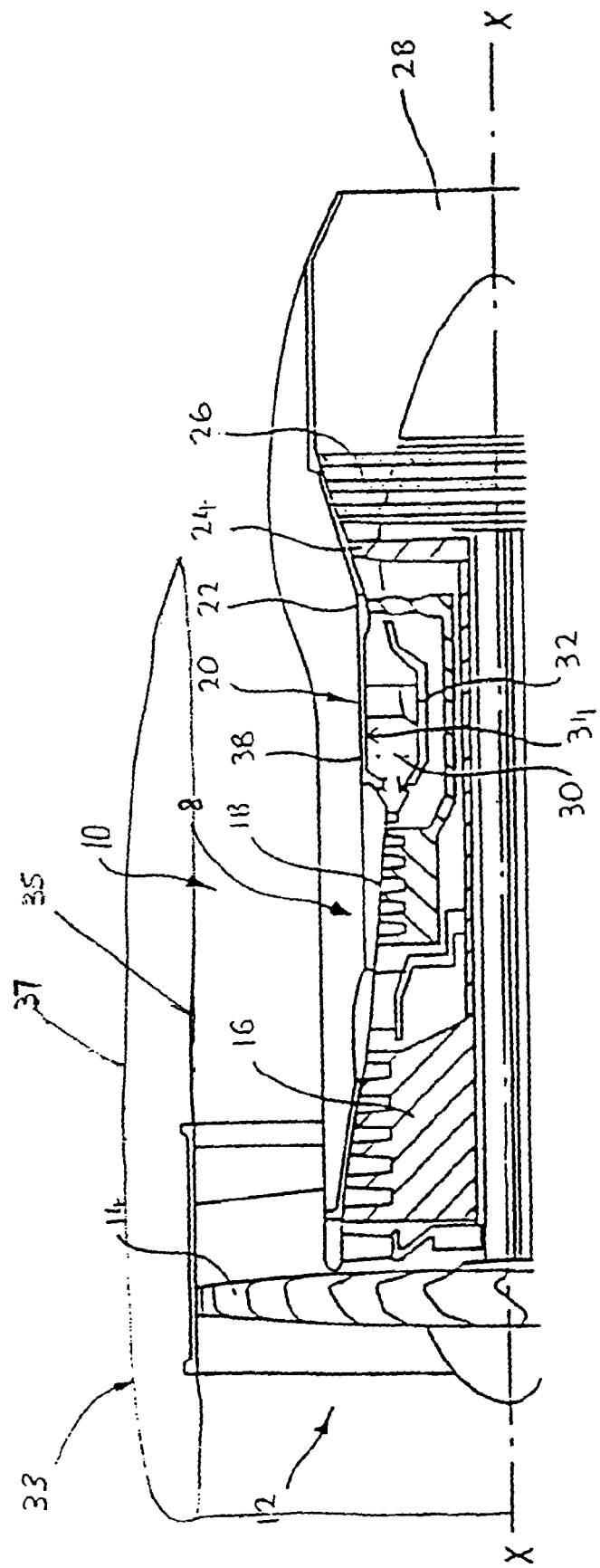
FIG. 1 is a diagrammatic sectional view showing the general arrangement of a known gas turbine engine.

With reference to FIG. 1 a ducted fan gas turbine engine generally indicated at 10 comprises, in axial flow series, an air intake 12, a propulsive fan 14, and a core engine 8, itself comprising in axial flow sequence, an intermediate pressure compressor 16, a high pressure compressor 18, combustion equipment 20, a high pressure turbine 22, an intermediate pressure turbine 24, a low pressure turbine 26 and an exhaust nozzle 28.

The gas turbine engine 10 works in the conventional manner so that air entering the intake 12 is accelerated by the fan 14 to produce two air flows, a first air flow into the intermediate pressure compressor 16 of the core engine 8 and a second airflow of "bypass air" which provides propulsive thrust. The bypass air flows within a nacelle 33 which surrounds part of the engine including the propulsive fan 14. The nacelle 33 is defined by radially inner and outer walls 35, 37 respectively. The intermediate pressure compressor 16 compresses the air flow directed into it before delivering the air to the high pressure compressor 18 where further compression takes place.

The compressed air exhausted from the high pressure compressor 18 is directed into the combustion equipment 20 where it is mixed with fuel and the mixture combusted. The resultant hot combustion products then expand through and thereby drive the high, intermediate and low pressure turbines 22, 24 and 26 before being exhausted through the nozzle 28 to provide additional propulsive thrust. The high, intermediate and low pressure turbines 22, 24 and 26 respectively drive the high and intermediate pressure compressors 16 and 18 and the fan 14 by suitable interconnecting shafts.

Figure 2:
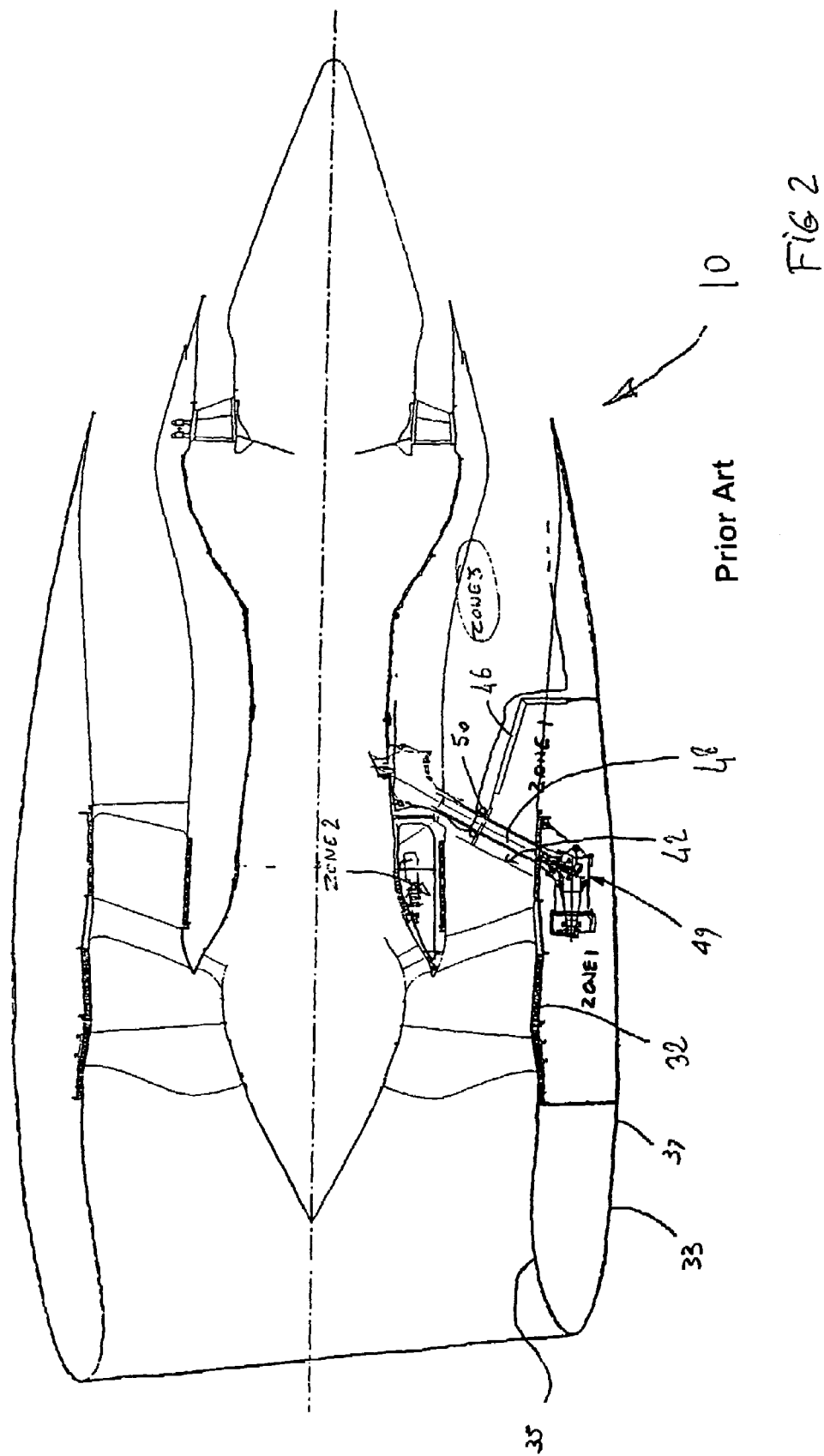
FIG. 2 is a more detailed sectional view of a gas turbine engine, illustrating the various different fire zones, according to the prior art.

FIG. 2 illustrates the gas turbine engine 10 in somewhat more detail. It may be seen that the engine 10 includes a fan case 32 which defines an outer boundary of a bypass zone through which the bypass air passes. Generally externally of the fan case 32 and between the walls 35, 37 there is defined a fire zone, Zone 1 and near to the core of the engine there are defined two further, hotter zones, Zones 2 and 3.

Each zone is separated from the adjacent zones by a fire wall. The fire walls prevent flammable fluid leaking between the zones and help prevent the spread of a fire starting in one of the zones.

Zone 3 is generally located radially inwardly of Zone 1. However, for a circumferentially limited extent at the base of the engine, Zone 3 is extended radially outwardly into Zone 1. The cross section of FIG. 2 has been taken approximately vertically through a centre of the engine and therefore through this radially extended Zone 3 region. A splitter fairing 42 divides and deflects the bypass air such that it passes smoothly around the downwardly extending Zone 3 region.

Figure 4:
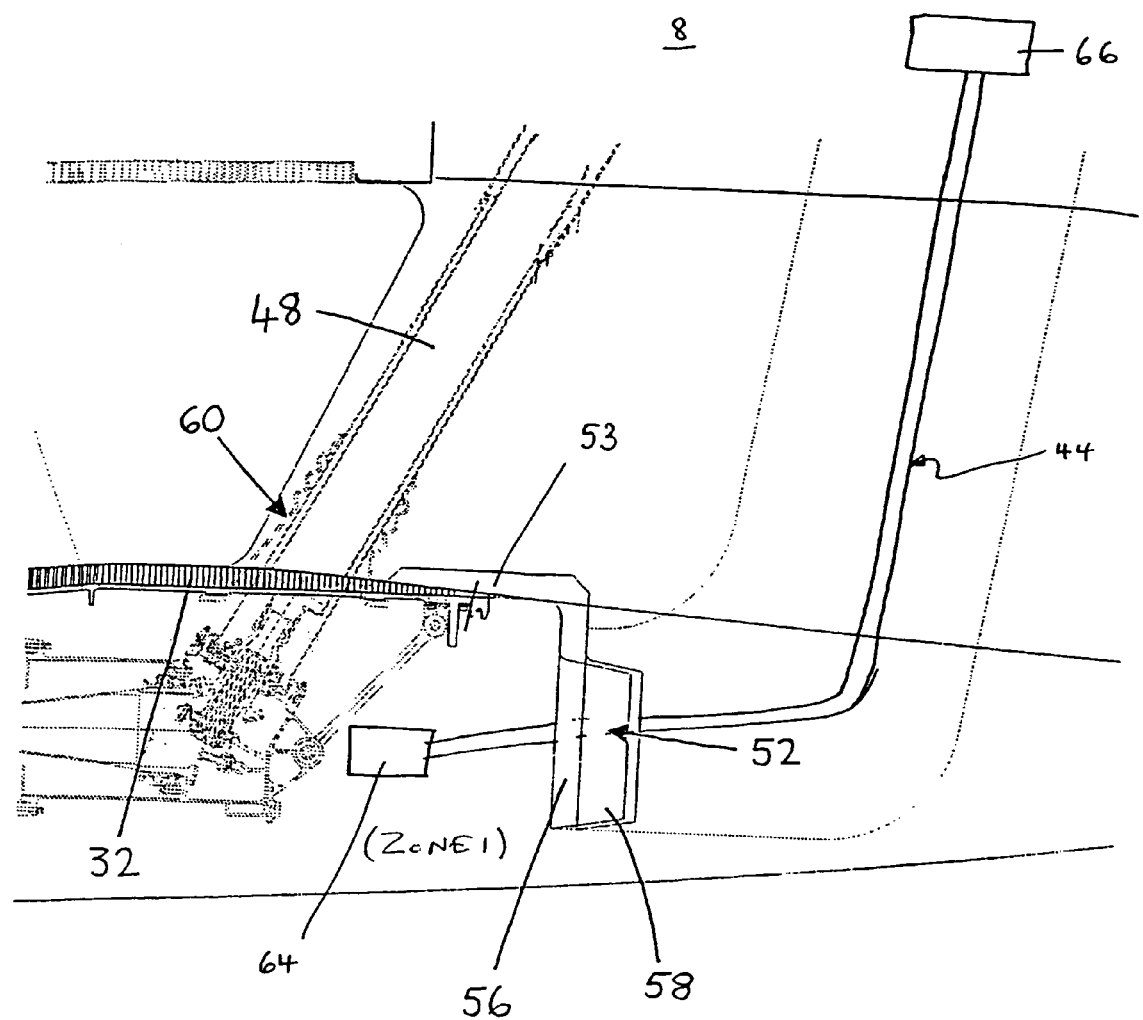
FIG. 4 is a diagrammatic side view illustrating the general arrangement of the invention.

Referring again to FIG. 2, it is necessary for pipes and harnesses to pass from the core region (Zone 3) to the fan case 32 region (Zone 1) to connect engine fluid systems 66, 64 respectively (see FIG. 4). In the prior art arrangement, the pipes and harnesses pass through a bifurcation disconnect panel 46 which defines a radially outer base of the extended Zone 3 region. The bifurcation disconnect panel 46 is provided to facilitate disconnection of pipes and harnesses leading to the core of the engine when the core engine is removed for example. The bifurcation disconnect panel 46 also forms a fire wall between Zones 1 and 3 and forms a mounting for the pipes and harnesses. Although not shown in the figures, the nacelle 33, surrounding the engine 10, comprises generally C-shaped cowl doors which are hingedly mounted to an upper part of the engine 10 or a pylon supporting the engine from a wing of an aircraft. The C-shaped doors are closable around the engine and seal against the bifurcation disconnect panel 46.

Figure 3:
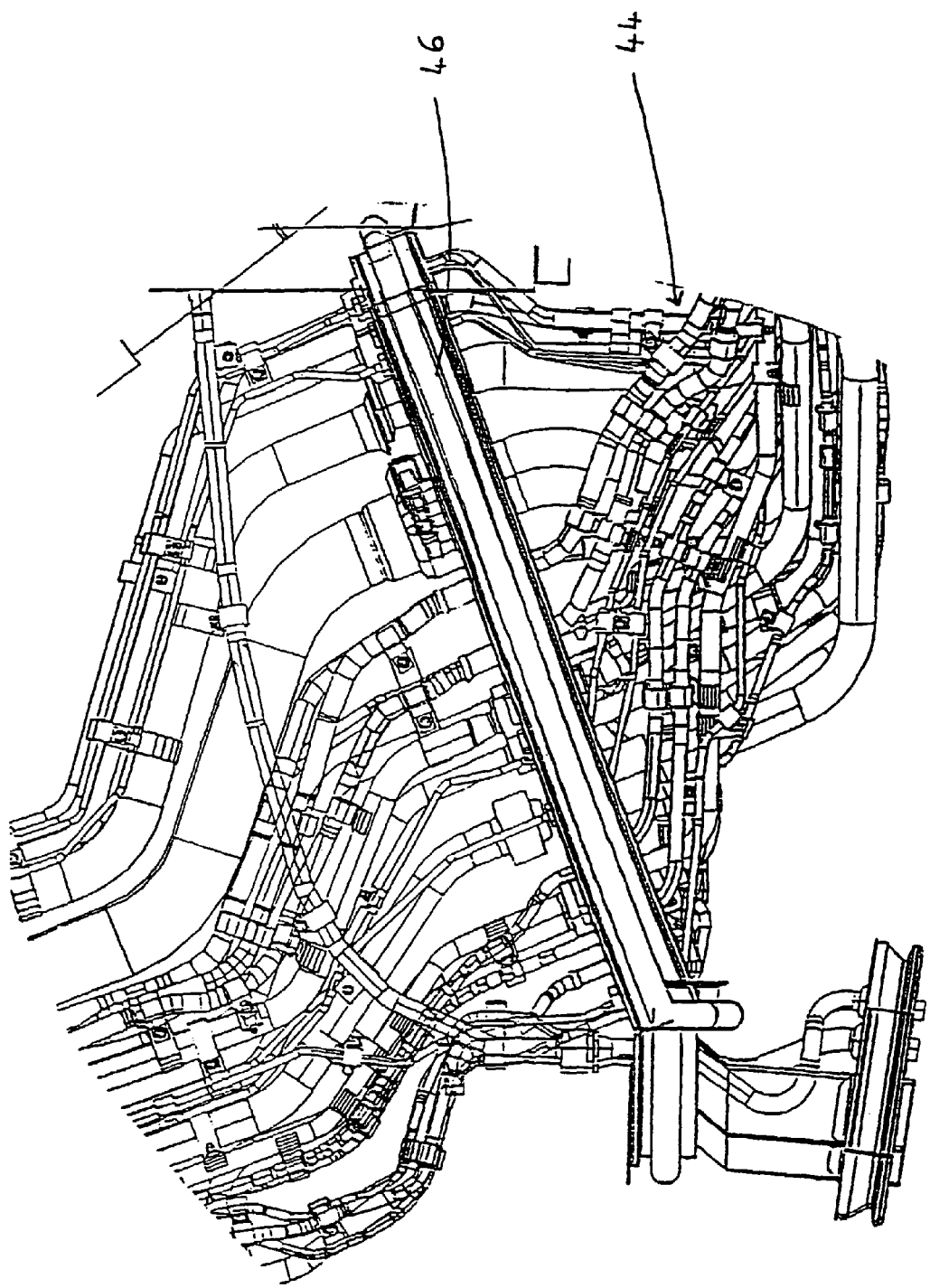
FIG. 3 is a diagrammatic illustration of a bifurcation disconnect panel according to the prior art.

FIG. 3 illustrates the disconnect panel 46 in more detail. It may be seen that the pipes and harnesses 44 cross the disconnect panel 46 substantially perpendicularly thereto. There is also a requirement for a minimum straight section before and after the disconnect region where the pipes/harnesses 44 cross the panel, as well as a minimum bend radius. These requirements result in an intricate and complex design, as may be seen from FIG. 3.

Referring again to FIG. 2, a radial drive 48 also passes through the bifurcation disconnect panel 46. The radial drive 48 transfers power from the high pressure turbine shaft to a gearbox 49 mounted on the fan case 32 in Zone 1. A D-seal 50 is provided between the radial drive 48 and the bifurcation disconnect panel 46. Although a D-seal 50 is preferred the seal 50 may be generally P-shaped or any other shape as known in the art.

Referring to FIGS. 4 to 7, there is illustrated a member in the form of a disconnect panel 52 which replaces the bifurcation disconnect panel 46 of the prior art. The disconnect panel 52 is mounted on the fan case 32 so as to extend downwardly and radially outwardly therefrom.

The disconnect panel 52 includes a mounting portion 53 which is adapted to be mounted on the fan case 32, the mounting portion being either generally planar or curved in a complementary way with the fan case 32. Extending downwardly from the mounting portion is a generally planar centre portion 56 which is approximately rectangular. Extending from each outer edge of the centre portion 56 is a side portion 58, each side portion 58 also being generally planar and rectangular. The side portions 58 are oriented at an angle of approximately 40° to 50° to the plane of the centre portion 56, although angles between 10° and 80° are suitable for other applications in different engine configurations. Each portion 56, 58 of the disconnect panel 52 is made from a sheet material such as steel or titanium. The thickness of the sheet material is about 0.4 to 0.5 mm. The disconnect panel 52 is able to withstand 1100° C. for 15 minutes with a standard flame producing 116 k $W/m^2 \pm 10$ $kW/m^2$. The skilled artisan would readily appreciate that the material used for and the thickness of the disconnect panel 52 are based on simple design considerations such as strength, weight and durability.

The disconnect panel 52 is so positioned and shaped that the side portions 58 are arranged substantially normal to the direction of certain pipes and harnesses 44 passing from Zone 3 to Zone 1 and the centre portion 56 is arranged substantially normal to the direction of the remainder of the pipes and harnesses 44. In this exemplary embodiment the disconnect panel 52 forms a fire wall between Zones 1 and 3 and also forms a mounting and a disconnect means for the pipes and harnesses 44, however, not all applications require the disconnect panel 52 to be a firewall.

Figure 8:
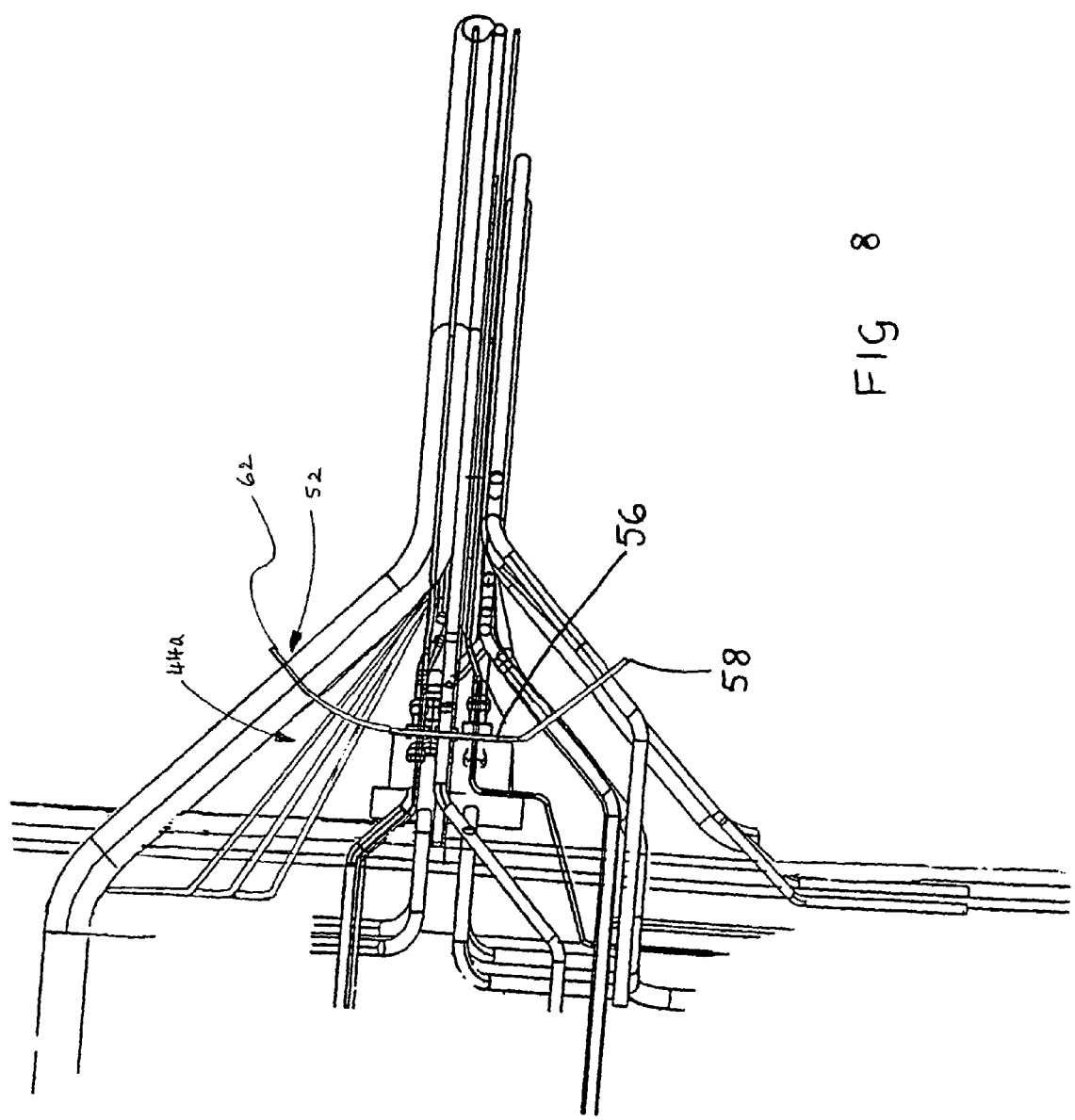
FIG. 8 is a diagrammatic bottom view illustrating the disconnect panel according to a second embodiment of the invention.

In a second embodiment, FIG. 8, the disconnect panel 52 comprises arcuate side portions 62 extending from the centre portion 56 that replaces the straight angled side portions 58 of the first embodiment. A further advantage of the arcuate portions 62 is to provide a perpendicular intersection for each pipe 44a of the plurality of pipes and harnesses 44 comprising a range of intersecting angles into and away from the disconnect panel 52. In this way and as can be seen in FIG. 8 the arrangement of the three pipes 44a are yet further improved by reducing the number of bends when compared to the same pipes in equivalent FIG. 6. Thus longer, straighter sections of pipe may be used, which reduces cost and minimises head losses for the flow of fluid through the pipes.

The end angle of the arcuate side portion(s) 62 (i.e. the tangential angle relative to the centre portion 56) is similar to the planar side portion 58 (shown opposite the arcuate side portion 62 on FIG. 8). The rate of curvature is constant i.e. it is a radius, but alternatively the rate of curvature may change dependent on the requirements of the pipes 44 intersecting the disconnect panel 52.

The present invention is also realised by a disconnect panel comprising only one side portion 58, 62 or one arcuate side portion 62 and one planar portion 58.

The disconnect panel 52 is shown arranged so that the centre portion 56 is substantially in a plane normal to the engine rotational axis X—X (FIG. 1), however, the disconnect panel 52 may be arranged in any suitable orientation depending upon any particular engine's arrangement of pipes and harnesses.

The arrangement of the above disconnect panel 52 therefore eliminates prior art constraints on routing, allowing an improved and simpler layout to be realised during design. The disconnect panel 52 eases design and re-design, preventing routing clashes and improving access to and identification of pipes and harnesses 44 during assembly and maintenance. There is also the scope to improve the clipping of pipes and harnesses 44, as clamp blocks can be more readily accommodated. Furthermore, one type of clamp can be used in several locations since all the pipes are parallel. This reduces the amount of additional clips used, which results in shorter assembly and removal time and lower pipe costs. The improved layout of the pipes and harnesses 44 greatly reduces the chance of incorrect assembly or reassembly.

Figure 5:
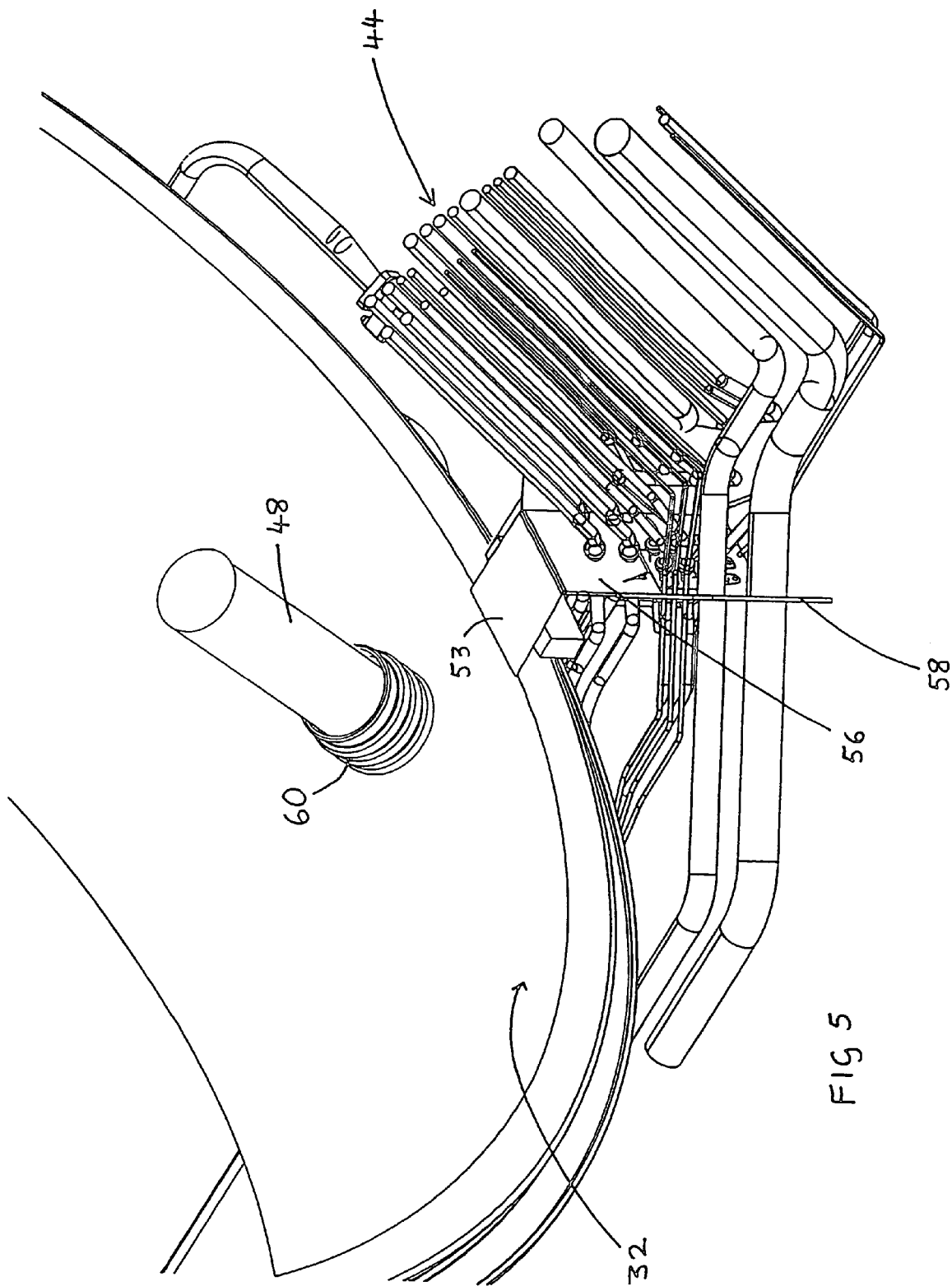
FIG. 5 is a diagrammatic perspective view illustrating a disconnect panel according to the invention.
Figure 6:
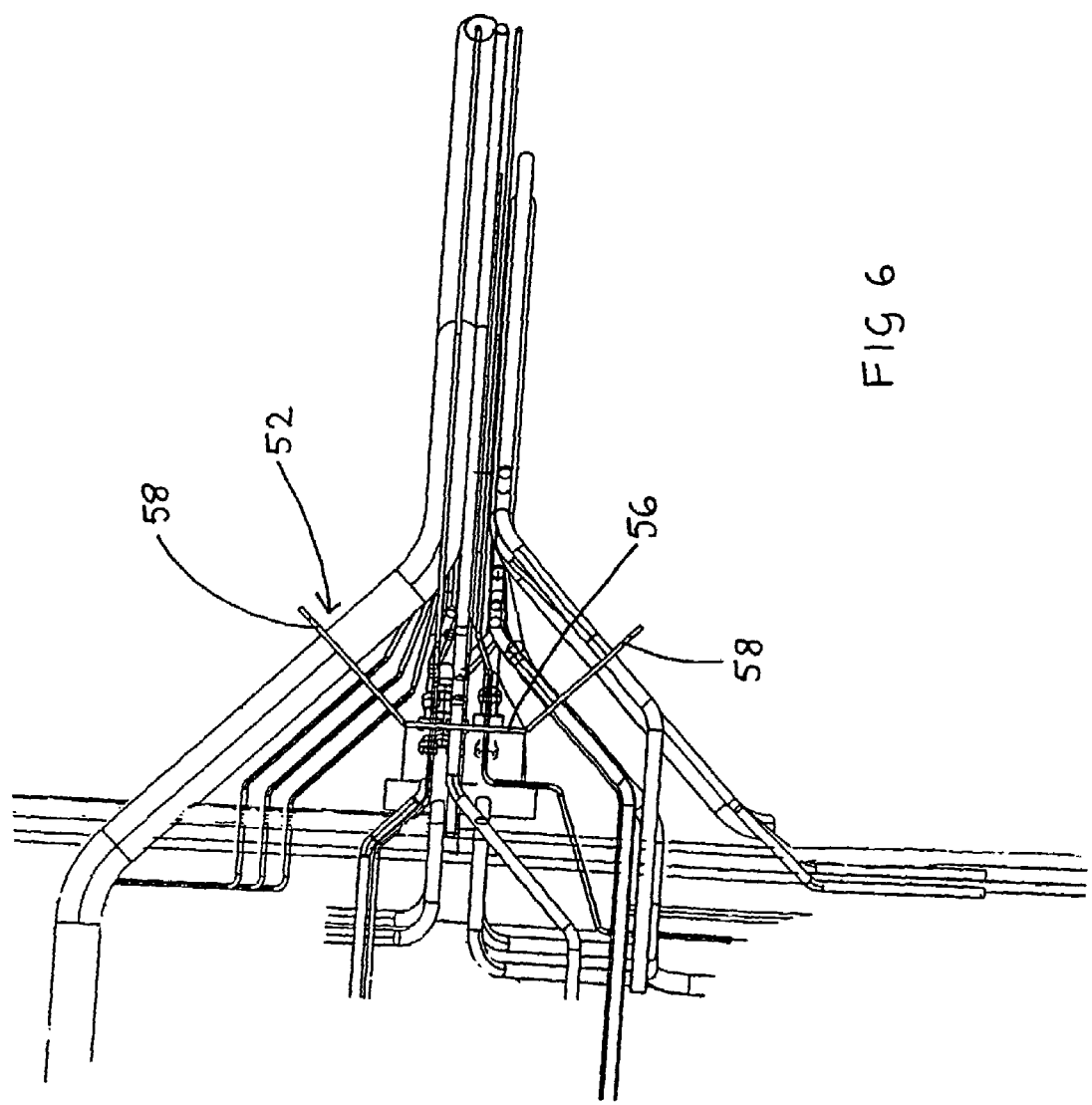
FIG. 6 is a diagrammatic bottom view illustrating the disconnect panel according to the invention.
Figure 7:
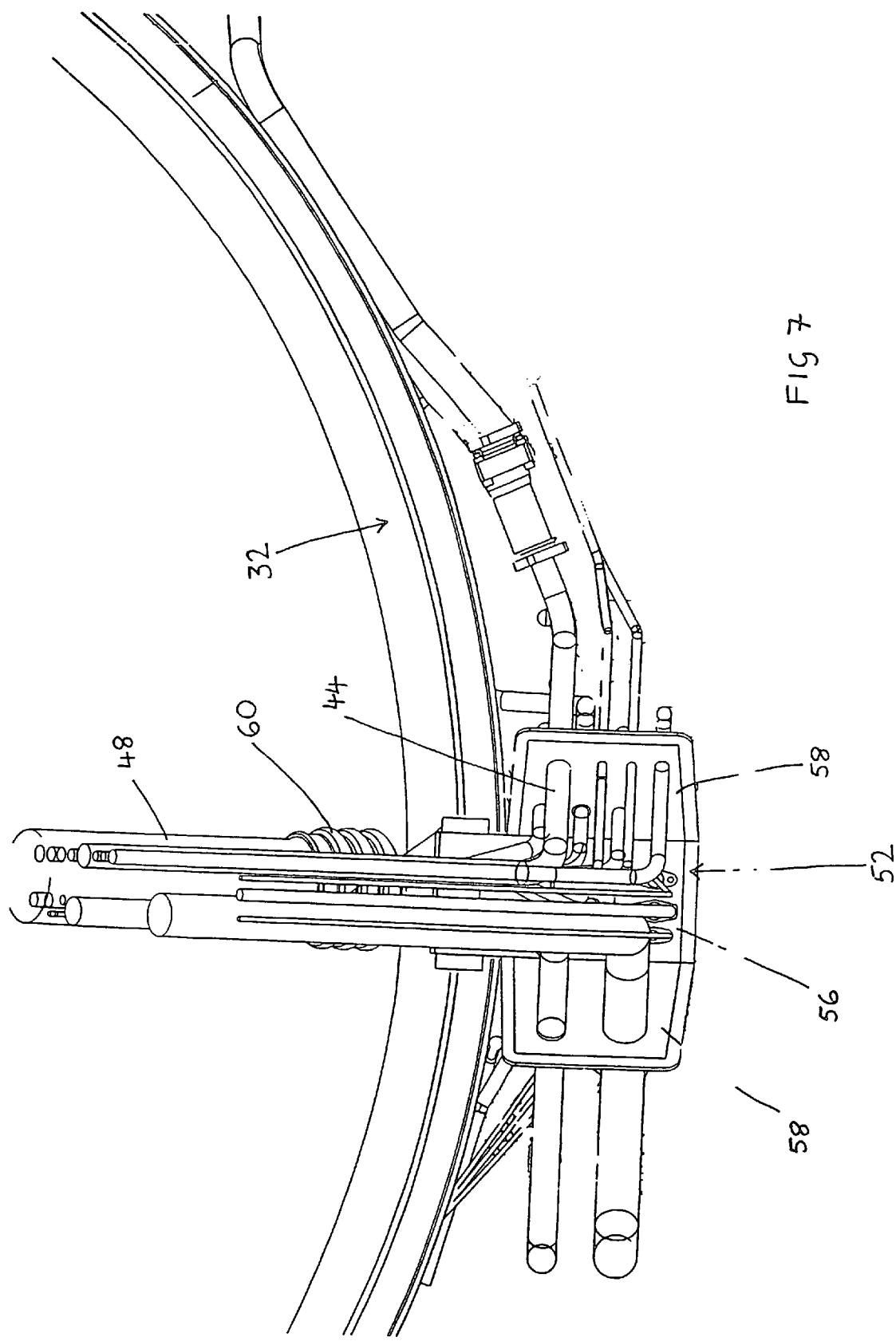
FIG. 7 is a diagrammatic view from the front, illustrating the disconnect panel according to the invention.

The location of the disconnect panel 52 at the bottom of the lower bifurcation area also allows for better sealing between Zones 1 and 3. In particular, the radial drive 48 may pass through and be sealed against the fan case 32 near to the lower end of the radial drive, where efficient sealing is easier to achieve. Referring in particular to FIGS. 4, 5 and 7, the radial drive 48 may be sealed with a bellow seal 60 which enables the radial drive to move freely relative to the fan case 32. Vibration from excitation to the splitter fairing 42 will therefore not be fed to the radial drive 48. Further, as the bellow seal 60 does not prevent free displacement of the radial drive 48 locally, any difficulties with an O-ring seal provided between the radial drive 48 and the transfer gearbox disappear. Finally, the bellow seal 60 allows a reduction of the gap between the splitter fairing 42 and the radial drive 48 which improves the aerodynamics of the engine.

The present invention may be summarised in its simplest form, by the gas turbine engine 10 comprising the core engine 8 having fluid systems 66 and the fan case region (zone 1) having fluid systems 64. The fluid systems 64, 66 are connected via pipes and harnesses 44 which are releasable at a disconnect panel 52. The disconnect panel 52 comprises at least two angled portions 56, 58 for routing the pipes and harnesses therethrough, the at least two angled portions 56, 58 providing at least two surfaces for substantially perpendicular intersection with the pipes and harnesses 44. Although there is a requirement for a short section of pipe 44 or harness 44 to intersect the disconnect panel 52 at 90 degrees, angles other than 90 degrees may be accommodated in certain circumstances, such angles being up to 10 degrees from perpendicular. Various modifications may be made to be above described embodiment without departing from the scope of the invention. In particular, the shapes of the various components may be modified as may the materials from which they are constructed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gas turbine engine comprising a core engine including a first fire zone having a first fluid system and a fan case region including a second fire zone having a second fluid system wherein both the first and second fluid systems are connected via pipes and harnesses, the pipes and harnesses are releasable at a disconnect panel, characterised in that the disconnect panel comprises at least two angled portions for routing the pipes and harnesses therethrough, the at least two angled portions providing at least two surfaces for substantially perpendicular intersection with the pipes and harnesses.

2. A gas turbine engine according to claim 1 wherein each of the portions are substantially planar.

3. A gas turbine engine according to claim 1 wherein the disconnect panel comprises a centre portion and two side portions.

4. A gas turbine engine according to claim 1 wherein the at least two angled portions are angled between 10 and 80 degrees relative to one another.

5. A gas turbine engine according to claim 4 wherein the at least two angled portions are angled between 30 and 60 degrees relative to one another.

6. A gas turbine engine according to claim 1 wherein at least one of the portions is arcuate.

7. A gas turbine engine according to claim 6 wherein the least one arcuate portion comprises an end angle relative to the principle plane of other portion, the end angle is between 10 and 80 degrees.

8. A gas turbine engine according to claim 7 wherein the end angle is between 30 and 60 degrees.

9. A gas turbine engine according to claim 1 wherein the disconnect panel comprises a centre portion which is substantially planar and two side portions which are arcuate.

10. A gas turbine engine according to claim 1 wherein the disconnect panel is a fire wall.

11. A gas turbine engine according to claim 1 wherein the engine comprises a nacelle, when the nacelle enclose the engine it sealably engaged with the disconnect panel.

12. A gas turbine engine according to claim 1 wherein the first and second fire zones are separated by fire walls, the first fire zone is located generally radially inwardly of the second fire zone but includes a bifurcation part which extends radially outwardly of the remainder of the zone for a limited circumferential extent; wherein the engine further includes the disconnect panel mounted on the fan case to extend generally radially outwardly therefrom, the member forming a fire wall between the first and second zones and providing means for pipes and harnesses to be routed therethrough.

13. A gas turbine engine according to claim 12 wherein the disconnect panel is mounted to extend downwardly from the fan case, when the engine is in its normal orientation as mounted on an aircraft.

14. A gas turbine engine according to claim 12 wherein, the fan case comprises a rear part, and the disconnect panel is mounted on the rear part.

15. A gas turbine engine according to claim 4 wherein the disconnect panel further includes a mounting portion, the mounting portion is adapted for attachment to the fan case.

16. A gas turbine engine according to claim 7 wherein the mounting portion extends back from the mid-portion of the radial drive to the top of the disconnect panel and lies in a plane that is generally perpendicular to the plane of the mid-portion of the radial drive.

17. A gas turbine engine according to claim 1 wherein the disconnect panel comprises a material that is able to withstand 1100° C. for 15 minutes with a standard flame producing 116k W/m$^2$±10kW/m$^2$.

18. A gas turbine engine according to claim 1, wherein the gas turbine engine further includes a turbine drive shaft, a gearbox and a radial drive, the radial drive connecting the turbine drive shaft to the gearbox mounted on the fan case, the radial drive passing through the fan case.

19. A gas turbine engine according to claim 18 wherein a bellow-seal is provided between the radial drive and the fan case.

20. A gas turbine engine according to claim 19 wherein the bellow-seal is fireproof.

* * * * *